United States Patent
Matsubara et al.

(10) Patent No.: US 6,442,444 B2
(45) Date of Patent: *Aug. 27, 2002

(54) METHOD AND DEVICE FOR MANAGING EQUIPMENT CONNECTED TO CONTROLLER OF PRODUCTION MACHINE

(75) Inventors: Shunsuke Matsubara, Minamitsuru-gun; Tokuhisa Matsukane, Oshino-mura, both of (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,179

(22) PCT Filed: Oct. 22, 1997

(86) PCT No.: PCT/JP97/03821

§ 371 (c)(1),
(2), (4) Date: Jun. 10, 1998

(87) PCT Pub. No.: WO98/18065

PCT Pub. Date: Apr. 30, 1998

(30) Foreign Application Priority Data

Oct. 22, 1996 (JP) .............................................. 8-297975

(51) Int. Cl.[7] .............................................. G06F 19/00
(52) U.S. Cl. .............................. 700/95; 700/3; 700/245; 709/212
(58) Field of Search .............................. 700/95, 61, 56, 700/58, 3, 245; 364/468.01, 167.02, 167.08; 318/560; 709/212

(56) References Cited

U.S. PATENT DOCUMENTS

| | | | | |
|---|---|---|---|---|
| 4,901,218 A | * | 2/1990 | Cornwell | 364/131 |
| 5,146,861 A | * | 9/1992 | Sato et al. | 112/259 |
| 5,184,053 A | * | 2/1993 | Maruo et al. | 700/188 |
| 5,428,547 A | * | 6/1995 | Ikeda | 364/474.16 |
| 5,475,291 A | * | 12/1995 | Yoshida et al. | 318/632 |
| 5,555,179 A | * | 9/1996 | Koyama et al. | 364/468.01 |
| 5,656,906 A | * | 8/1997 | Iwashita et al. | 700/193 |
| 5,754,451 A | * | 5/1998 | Williams | 364/55 |
| 5,792,395 A | * | 8/1998 | Ito et al. | 425/145 |
| 5,796,986 A | * | 8/1998 | Fuller | |
| 5,984,503 A | * | 11/1999 | Strickland et al. | 364/468.01 |
| 5,994,861 A | * | 11/1999 | Tutumishita | 318/562 |
| 6,018,685 A | * | 1/2000 | Fujita et al. | 700/61 |
| 6,051,170 A | * | 4/2000 | Kamiguchi et al. | 700/200 |
| 6,065,857 A | * | 5/2000 | Hazama et al. | 364/468.01 |
| 6,219,583 B1 | * | 4/2001 | Kinoshita et al. | 700/3 |
| 6,226,181 B1 | * | 5/2001 | Hashimoto et al. | 361/695 |
| 6,252,367 B1 | * | 6/2001 | Sakamoto et al. | 318/560 |
| 6,278,902 B1 | * | 8/2001 | Hashimoto et al. | 700/245 |

FOREIGN PATENT DOCUMENTS

| | | |
|---|---|---|
| JP | 3-177952 | 12/1989 |
| JP | 2-58110 | 2/1990 |
| JP | 4-60704 | 2/1992 |
| JP | 06110540 | 4/1994 |
| JP | 09062323 | 3/1997 |

* cited by examiner

Primary Examiner—James P. Trammell
Assistant Examiner—Firmin Backer
(74) Attorney, Agent, or Firm—Staas & Halsey LLP

(57) ABSTRACT

Amplifiers connected to a CNC are provided individually with memories that are stored with ID data for discriminating the kinds and properties thereof and ID data as maintenance management data. Likewise, motors are provided with memories stored with ID data. The management of the amplifiers and the motors is facilitated by reading these ID data from the CNC and displaying them on a display unit. Based on the ID data, moreover, adaptation or nonadaptation between the motors and the amplifiers is automatically determined by means of the CNC.

9 Claims, 4 Drawing Sheets

| SLAVE No. | AMPLIFIER TYPE | UNIT NAME | SERIES | AXIS NUMBER | MAXIMUM CURRENT | SERIAL No. |
|---|---|---|---|---|---|---|
| 1 | A1-L | SVU | β | 1 | 12A | EA6700001 |
| 2 | A2-L | SVM | α | 2 | 40A | EA6700003 |
| 3 | A2-M | SVM | α | 2 | 80A | EA6700003 |
| 4 | A3-L | SVM | α | 2 | 80A | EA6700004 |
| 5 | A3-M | SVM | α | 2 | 80A | EA6700004 |
| 6 | A4-L | SVU | α | 1 | 40A | EA6700002 |

METHOD AND DEVICE FOR MANAGING EQUIPMENT CONNECTED TO CONTROLLER OF PRODUCTION MACHINE

FIELD OF THE INVENTION

The present invention relates to management method for apparatuses, such as motors and amplifiers that are used in various manufacturing machines, such as robots, machine tools, and general industrial machines, and a control device for the management.

BACKGROUND OF THE INVENTION

The kinds, operating conditions, performance characteristics and other specifications of motors, amplifiers and other apparatuses that are used in various manufacturing machines, such as robots, machine tools, and general industrial machines, are conventionally identified by the apparatuses including the amplifiers, motors, etc., name plates pasted on the apparatuses, or specification forms. When these apparatuses are in trouble, their maintenance management requires use of information data, such as the version numbers, lot numbers, serial numbers, etc. of these apparatuses, as well as the kinds, types, and specifications thereof. These necessary information data for the maintenance management are also obtained with reference to the specification forms, manuals, etc. of those apparatuses and name plates pasted on the apparatuses.

When the apparatuses that are connected to a control device for any of various manufacturing machines, such as robots, machine tools, and general industrial machines, are exchanged, these apparatuses and the control device must be made congenial to one another. It is inconvenient and troublesome to check this congeniality with reference to the specification forms, manuals, or name plates. Further, some apparatuses, such as motors and amplifiers, are required to be congenial to one another. If a nonadaptive motor is attached to an amplifier, the motor may possibly be damaged.

In troubleshooting or maintaining these apparatuses, it is necessary to obtain information data, such as the version numbers, lot numbers, serial numbers, etc. of the apparatuses, in advance. It is inconvenient and time-consuming, however, to obtain these information data from the specification forms, manuals, or name plates of the apparatuses.

DESCRIPTION OF THE INVENTION

An object of the present invention is to make it possible that a control device for any one of various manufacturing machines, such as robot, machine tool, and general industrial machine identifies data for discriminating the kinds and properties of apparatuses and data for maintenance management, such as version numbers, lot numbers, serial numbers, etc.

Another object of the present invention is to make it possible that a control device for manufacturing machine checks apparatuses connected thereto for congeniality.

In order to achieve the above object, according to one aspect of the present invention, there is provided a management method for apparatuses connected to a control device for a manufacturing machine, in which apparatuses connected to a control device for any one of various manufacturing machines, such as robot, machine tool and general industrial machine are provided with storage means storing data for discriminating the kinds and properties of the apparatuses or data for the maintenance management of the apparatuses, and the data stored in the storage means are read from the control devices and displayed on a display unit.

Preferably, the control device includes an interface through which the data read from said storage means can be delivered to an external computer so that said external computer can manage a plurality of apparatuses used for the control device.

Preferably, the control device includes an interface connected to a public network, and transmits the data read from said storage means to an external computer through the public network so that said external computer can manage the apparatuses used for the control device.

In another aspect according to the method of the present invention, moreover, apparatuses connected to a control device for a manufacturing machine, such as robot, machine tool and general industrial machine, are provided with storage means storing data for discriminating the kinds and properties of the apparatuses, the data stored in the storage means are read from the control devices, and the control means automatically determines whether or not the individual apparatuses are adaptive to one another in accordance with the read data.

Preferably, the apparatuses connected to the control devices are amplifiers or motors.

In another aspect according to the method of the present invention, amplifiers or motors connected to control devices for manufacturing machines are provided with storage means stored with data for discriminating the kinds and properties of the amplifiers or motors, and storage sections of the control devices are provided with parameter tables stored with data for discriminating the properties of the amplifiers or motors, and in which data for discriminating properties corresponding to the model name of the amplifiers or motors are read from the storage sections and data for discriminating properties are read from the storage means of the motors or amplifiers when the model name is inputted through input means of the control devices, whereby it is determined whether or not the amplifiers and the motors are congenial to one another.

According to the present invention, the apparatuses that are connected to the control devices for various manufacturing machines, such as robots, machine tools, and general industrial machines, are provided with the storage means stored with the data for discriminating the kinds and properties of the apparatuses and the data for the maintenance management of the apparatuses, and the connected apparatuses can be discriminated by reading and displaying these data, so that the maintenance management of these apparatuses is easy. Further, these apparatuses can be checked for congeniality, so that wrong connection can be prevented.

DESCRIPTION OF THE PREFERRED EMBODIMENT

Figure 1:
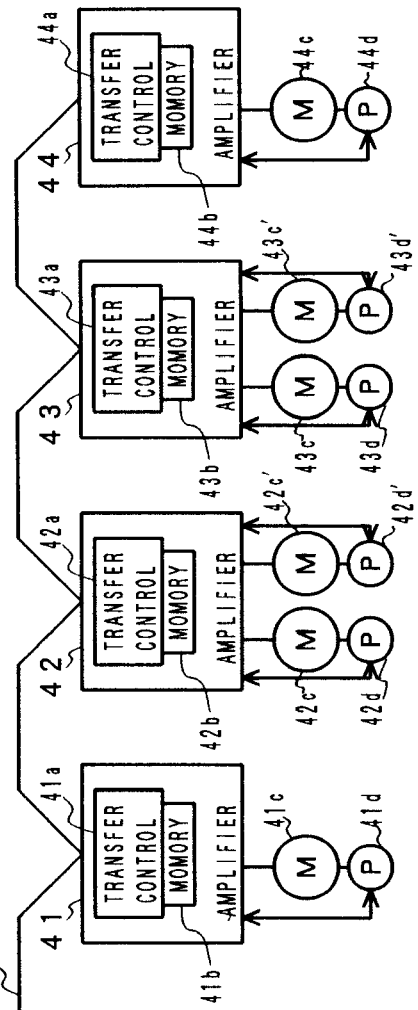
FIG. 1 is a block diagram showing an example of a control system for a numerically controlled machine tool, robot, etc. to which a method of the present invention is applied.
Figure 1:
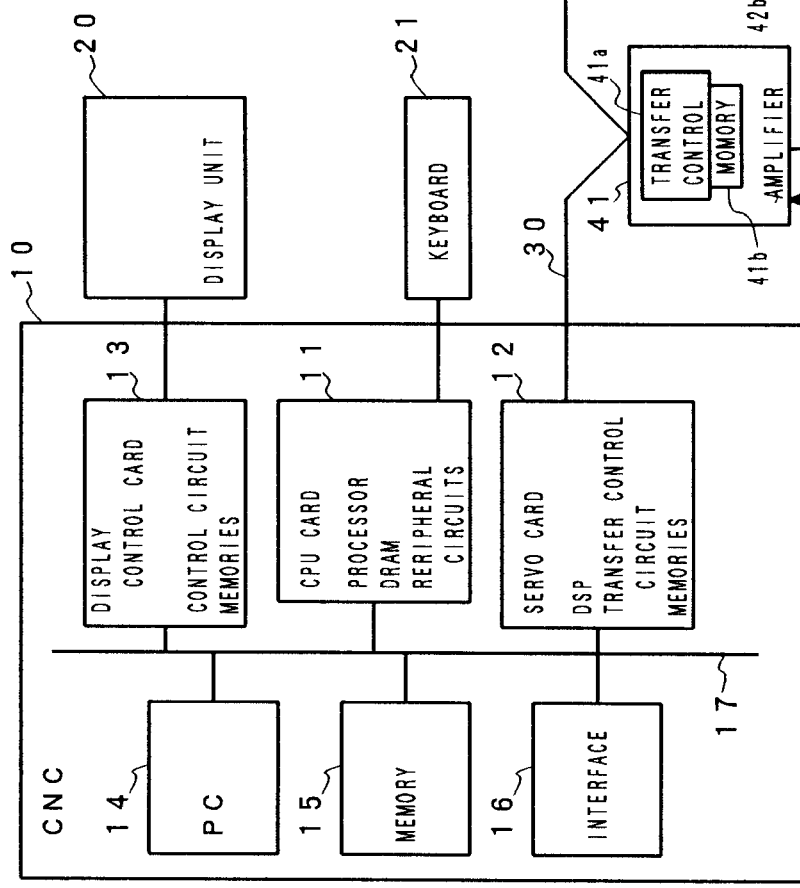

Referring to the block diagram of FIG. 1, one embodiment of a control system for a numerically controlled machine tool, robot, etc. to which the present invention is applied will be described.

A numerical control device 10 has a CNC control unit formed of one printed board (hereinafter referred to as "CNC control unit printed board"). This CNC control unit printed board is mounted with a CPU card 11, servo card 12, and display control card 13, which are modularized by mounting hardware on a smaller printed board, in a replaceable manner. A circuit of a programmable controller (hereinafter referred to as "PC") 14 for sequence control with the machine, a memory circuit 15, and an interface circuit 16 are further provided. The memory circuit 15 is composed of a flash memory (electrically writable nonvolatile semiconductor memory) for storing CNC software and an SRAM (writable volatile semiconductor memory) backed up by means of a battery and used to store NC machining programs, various parameters, etc. The interface circuit 16 serves for connection with a spindle amplifier, connection with an external computer such as a personal computer, connection to a public network through a modem, etc. The CPU card 11, servo card 12, display control card 13, PMC circuit 14, memory circuit 15, and interface circuit 16 are connected to one another by means of a bus 17.

The CPU card 11, which is mounted with a circuit for executing numerical control processing, comprises a processor, DRAM stored with CNC control programs, and other peripheral circuits. The processor executes functions to interpret operation commands delivered from the machining programs and calculate move commands for servomotors for individual axes, functions to interpret the operation commands and transmit to and receive on-off signals from the machine, and a function to allow communication with a machine operator through a keyboard and a display unit 20, etc. Among these elements, the peripheral circuits include an MDI interface connected to the keyboard 21, an interface through which the NC machining programs and the like from an external storage medium such as a floppy disk are inputted, an interface for a manual pulse generator, etc. This CPU card 11 is changeably coupled to the CNC control unit printed board by means of a connector (not shown). By exchanging the CPU card 11, the function of the numerical control device can be replaced with a higher-level function or a higher-version function of the same level.

The servo card 12 is composed of a digital signal processor (DSP), a serial transfer control circuit for controlling a cable (serial servo bus) 30, and memories such as a ROM, SRAM, etc. The DSP carries out position feedback control, speed feedback control and current control of the servomotor for each axis in accordance with move commands for each axis instructed from the CPU card 11 and position, speed and feedback signals fed back from a built-in position-speed detector (hereinafter referred to as pulse coder) in each servomotor through the serial servo bus 30, and generates commands for servo amplifiers. Further, as the servo card 12 is detachably coupled to the CNC control unit printed board, if the number of servomotors (number of axes) or the like is changed, the servo card 12 may be exchanged.

The display control card 13 is mounted with a display control circuit that is formed of a processor, memory, etc.

The display control card 13 is connected to the display unit 20 through a connector on a printed board of this card by means of a cable. The display unit 20 displays machining programs, work shape, tool shape, tool path, etc. Also, it is used for generating and editing the machining programs.

The PC 14 includes a flash memory that is used to store sequence programs, and is connected with a cable for transmitting to and receiving signals from various sensors and actuators of the machine.

The numerical control device 10 and servo amplifiers 41 to 44 are connected in a daisy-chain form by means of the serial servo bus 30 that is formed of one optical fiber cable. Provided in the servo card 12 of the numerical control device 10 is a serial transfer control circuit for controlling the serial servo bus 30. The servo amplifiers 41 to 44 are also provided with serial transfer control circuits 41a to 44a, respectively. The DSP of the servo card 12 delivers command currents, which are to be supplied to servomotors 41c to 44c through the serial servo bus (optical fiber cable) 30 by the daisy-chain system, to the servo amplifiers 41 to 44, individually. The servo amplifiers 41 to 44 detect driving currents for the servomotors 41c to 44c, and feed back signals that are obtained by converting the detected currents into digital data and signals from position-speed detectors (pulse coders) 41d to 44d of the servomotors to the servo card 12. Further, ID data for the amplifiers and the motors mentioned later are transmitted to the DSP.

The servo amplifiers 41 to 44 are provided, respectively, with memories (EEPROM's) 41b to 44b stored with ID data for specifying the amplifiers. These ID data are composed of data for specifying working conditions of the amplifiers, such as the kinds and performance characteristics of the servo amplifiers, and data for maintenance management utilized for the maintenance management of version numbers, lot numbers, serial numbers, etc. Further, the respective electric circuit sections of the position-speed detector 41d to 44d are fitted with memories (EEPROM's) stored with ID data for specifying the servomotors 41c to 44c to which the position-speed detectors are attached individually. These ID data are also composed of data for specifying working conditions of the motors, such as the kinds and performance characteristics of the motor and data for maintenance management utilized for the maintenance management of the version numbers, lot numbers, serial numbers, etc.

Stored as ID data for the amplifiers are, for example, kinds of units [SVM (Servo Amp. Module), SVU (Servo Amp. Unit), six axes, SPM (Spindle Amp. Module), PSM (Power Supply Module) . . . ], series names ($\alpha$, $\beta$. . . ), numbers of amplifier axes (1, 2, 3, 6), amplifier axis numbers (L, M . . . ), maximum current values (12 A, 20 A, 40 AS, 40 AL, 80 A . . . ), etc., and moreover, with amplifier unit version numbers (e.g., 03A . . . ), serial numbers (e.g., EA6700001 . . . ) including lot numbers, etc.

Likewise, stored as ID data for the motors are data such as motor kinds, adaptive amplifier maximum current values, version numbers, serial numbers, etc.

The ROM in the servo card 12 is stored with control standard parameters for each kind of amplifier and each kind of motors in the form of a standard parameter table, and these parameters include the maximum current value for an amplifier and the maximum current for the amplifier adaptive to a certain motor.

When an amplifier ID data read command is then inputted by means of the keyboard 21, the processor of the CPU card 11 transfers this command to the servo card 12, the digital signal processor (DSP) of the servo card 12 reads amplifier ID data from the memories 41a to 44a of the servo amplifiers through the serial servo bus 30, and the display control card 13 causes the display unit to display the amplifier ID data.

Figures 2, 3:
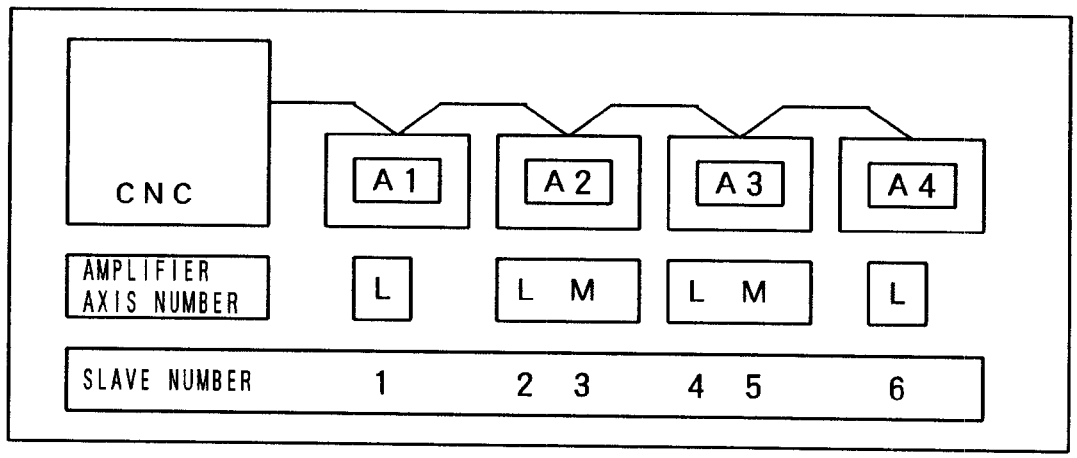
FIG. 2 is a diagram for illustrating amplifier ID data display in the control system shown in FIG. 1.
FIG. 3 is a system diagram to be assumed according to the amplifier ID data display.

FIG. 2 shows a display example of the amplifier ID data. "SLAVE No." represents number of an axis, successively attached to the axes (servomotors) in order from the one nearest to the numerical control device 10. "AMP. TYPE" represents number of an amplifier, successively attached to the amplifiers in order from the nearest one to the numerical control device, and specifies the axes that correspond to slaves, individually. For example, a slave 1 is composed of a first amplifier Al, and is indicated by "L" that represents a first axis of this amplifier. "A2-L" indicates that a slave 2 is composed of a first axis of a second amplifier. "A2-M" indicates that a slave 3 is composed of a second axis M (M represents a second axis) of the second amplifier. Others are indicated in like manner.

"UNIT NAME" represents amplifier kinds. "SERIES" represents series names. "AXIS NUMBER" represents the numbers of axes the amplifier has. "MAXIMUM CURRENT" represents maximum values of current that can be delivered from the axes of the amplifiers. Further, "SERIAL No." represents serial numbers that include the year of production and lot number each.

From the contents displayed in this manner, the operator can imagine a system such as the one shown in FIG. 3. In this system, amplifiers A1, A2, A3 and A4 are connected to the numerical control device in the order named. It can be understood that the amplifier A1 has one axis, amplifier A2 has two axes, amplifier A3 has two axes, and amplifier A4 has one axis, thereby forming six slaves. Further, since the unit name, series, axis number, maximum current, and serial number of each of the amplifiers are also displayed, these indications are helpful to maintenance management of these amplifiers.

The display control circuit 13 may be given a function such as to process the ID data on each apparatus read by the digital signal processor (DSP) of the servo card 12 to cause the display unit 20 to display the data in an easy form for the operator to see, using a graphic such as the one shown in FIG. 3.

Also, the ID data for the motors can be read in a manner such that the DSP of the servo card 12 accesses the memories in the position-speed detectors 41d to 44d, which are stored with the motor ID data, through the serial servo bus 30 and the servo amplifiers 41 to 44, and can be displayed on the display unit 20 in like manner.

Further, the external computer, such as a personal computer, may be connected through the interface 16 so that the ID data for the amplifiers and the motors can be delivered to the computer to manage the amplifiers and the motors intensively through the computer. Furthermore, the system may be connected to a public network, such as a telephone line, through the interface 16 so that it is connected to a computer of a service center or the like in a remote place. In case of fault in the system, the ID data for the amplifiers and the motors can be transmitted to the computer of the service center and serve as reference data for the investigation of the cause of the fault and troubleshooting.

Figure 4:
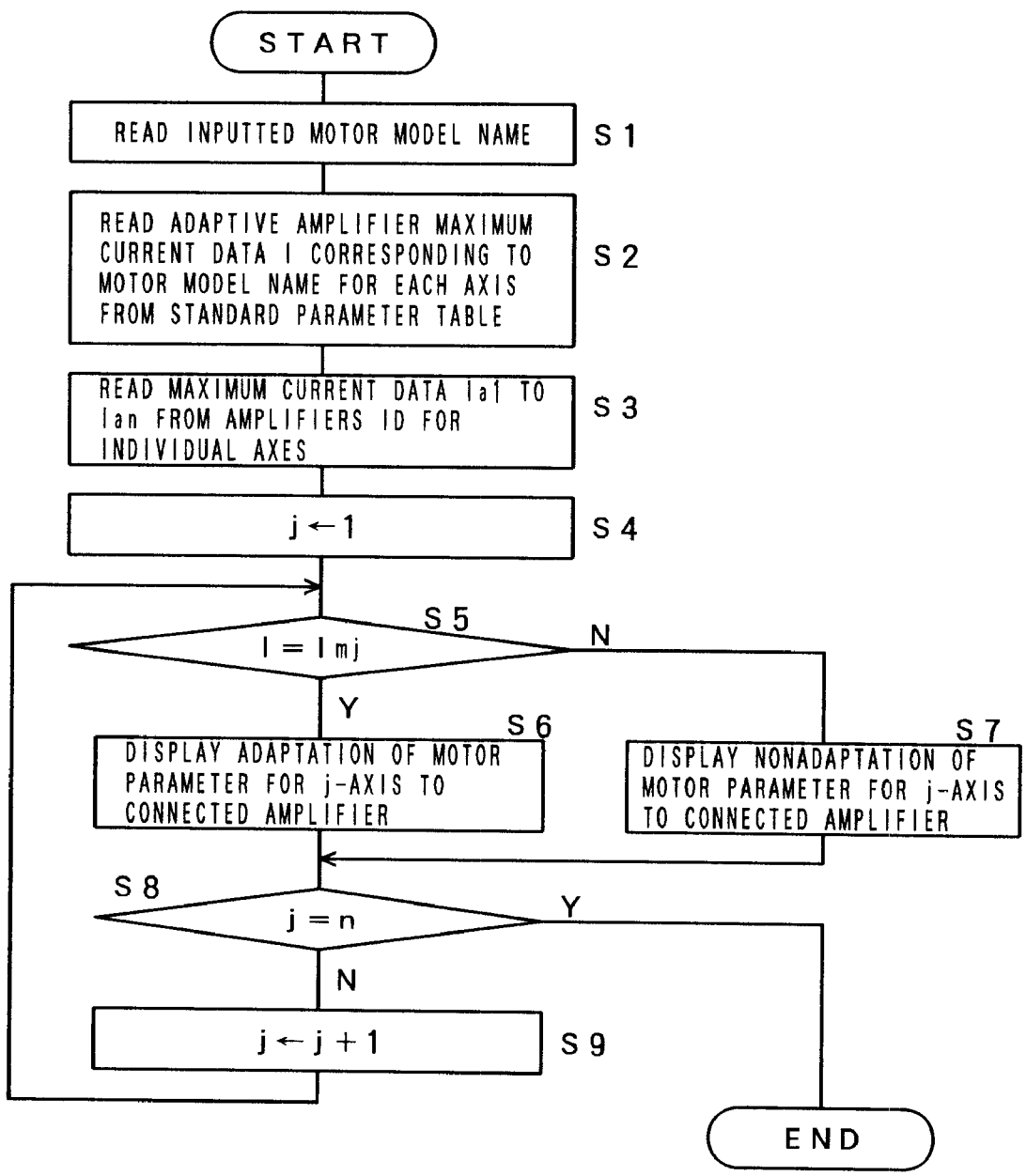
FIG. 4 is a flowchart showing processes for checking motors with inputted motor model names and amplifiers for congeniality according to the control system shown in FIG. 1.

In attaching a servomotor to an amplifier or in replacing the servomotor, moreover, the motor model name is inputted through the keyboard 21, and a command for collation with the amplifier is inputted. Thereupon, the DSP of the servo card 12 starts the collating operation of FIG. 4. More specifically, the inputted motor model name is read (Step S1), and adaptive amplifier maximum current data I corresponding to the motor model name is read from the standard parameter table stored in the memory (Step S2). Then, maximum current data Ia1 to Ian (n=6 in this embodiment) are read out of the amplifier ID data stored in the memories 41a to 44a of the individual amplifiers (Step S3), an index j indicative of the axis is set at "1" (Step S4), and the adaptive amplifier maximum current data I for the inputted motor is compared with maximum current data Iaj for the read amplifier ID. If the data I corresponds to the data Iaj, an indication that the motor parameter for the j-axis is adaptive to the connected amplifier is displayed on the display unit 20 (Step S6). On the other hand, if the data I does not correspond to the data Iaj, indication of nonadaptation is displayed (Step S7). Then, it is determined whether or not the index j reached the maximum axis number n (Step S8). If not reached the maximum axis number n yet, "1" is added to the index j (Step S9), and the program returns to Step S5, whereupon the process of Step S5 and the subsequent processes are repeated until the index j reaches the maximum axis number n.

In consequence, the axis of the amplifier to which the motor with the inputted motor model name is adapted is discriminated automatically.

Figure 5:
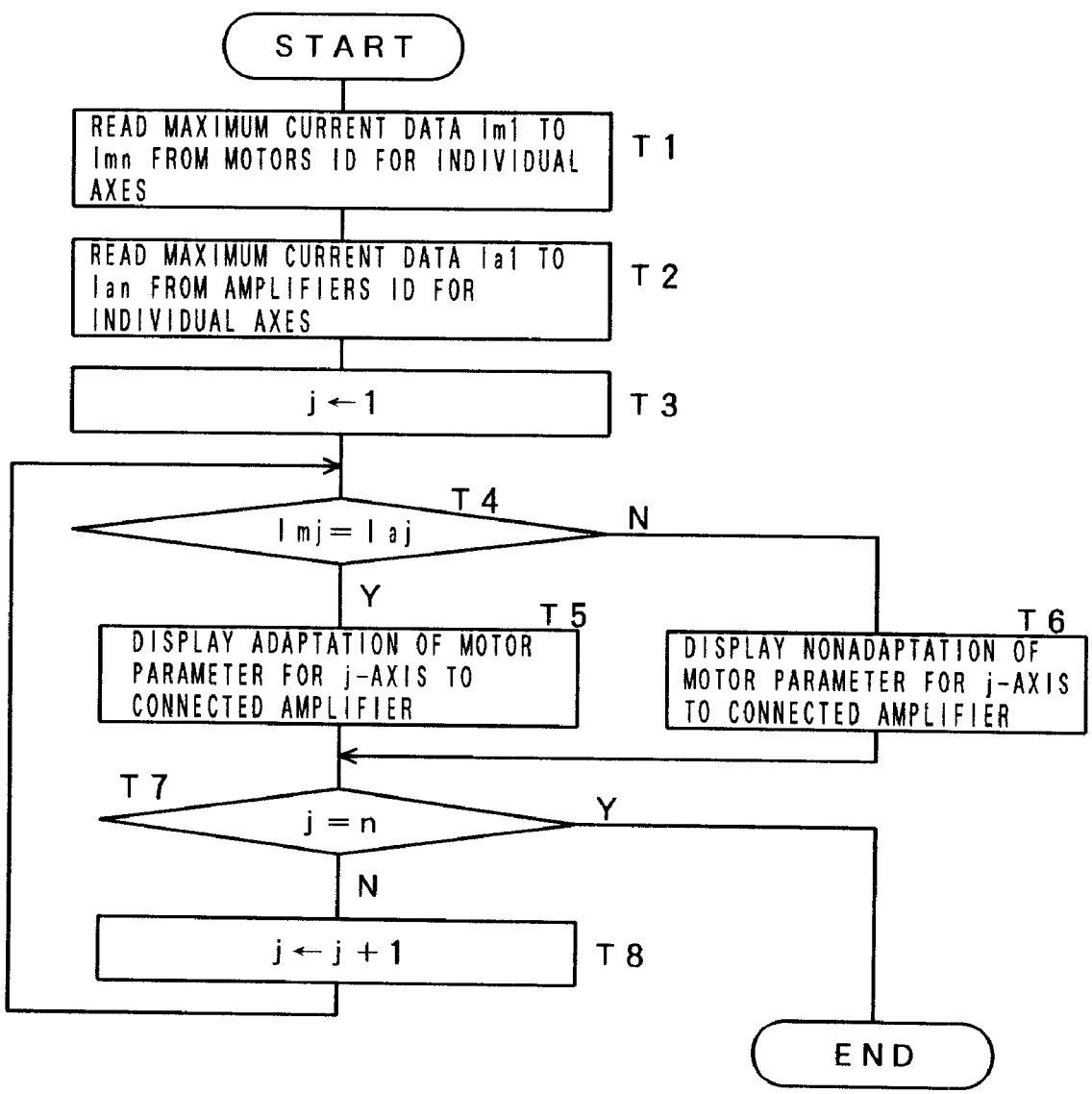
FIG. 5 is a flowchart showing processes for checking amplifiers and motors for congeniality according to the control system shown in FIG. 1.

Further, when a motor is already attached to an amplifier, in determining whether or not the amplifier and the motor are adaptive to each other, an acknowledgement command for adaptability between the amplifier and the motor is inputted through the keyboard 21. Thereupon, the DSP of the servo card 12 starts the processes shown in FIG. 5. Thus, adaptive amplifier maximum currents Im1 to Imn for the motors are read from the motor ID data that are stored in the memories in the amplifiers and the position-speed detectors, and further, maximum currents Ia1 to Ian are read from the amplifier ID data (Steps T1 and T2). The index j for specifying the axis is set at "1" (Step T3), and it is determined whether or not the maximum current of the j-axis motor and the maximum current Imj of the amplifier for the j-axis are equal (Step T4). If the values Iaj and Imj are equal, indication that the amplifier 13 adapted to the motor parameter for the j-axis is displayed (Step T5). If not equal, on the other hand, indication of nonadaptation is displayed (Step T6). Then, "1" is added to the index j until the index j reaches the maximum axis number n (Steps T7 and T8), and the process of Step T4 and the subsequent processes are repeated.

As a consequence, as adaptation or nonadaptation between the amplifiers and the motors are displayed on the display unit 20 and recognized, so that the system can be prevented from being driven with the motors wrongly mounted or from failing to be driven normally, and the motors can be prevented from being damaged.

What is claimed is:

1. A management method for a servo amplifier or a servo motor connected to a control device for a manufacturing machine such as a robot, machine tool and general industrial machine, comprising:

providing a storage integral to the servo amplifier or the servo motor;

storing data in the storage for discriminating fixed properties of said servo amplifier or servo motor; and displaying the data stored in said storage on a display unit.

2. The management method for a servo amplifier or a servo motor connected to a control device for a manufacturing machine according to claim 1, wherein said control device includes an interface through which the data read from said storage can be delivered to an external computer so that said external computer can manage a plurality of servo amplifiers or servo motors used for the control device.

3. The management method for a servo amplifier or a servo motor connected to a control device for a manufacturing machine according to claim 1, wherein said control device includes an interface connected to a public network, and transmits the data read from said storage to an external computer through the public network so that said external computer can manage the servo amplifiers or servo motors used to the control device.

4. A management method for servo amplifiers or servo motors connected to a control device for a manufacturing machine, such as a robot, machine tool and general industrial machine, comprising:

providing a storage integral to the servo amplifiers or servo motors;

storing data in the storage for discriminating fixed properties of said servo amplifiers or servo motors;

reading the data stored in said storage from said control devices; and automatically determining whether or not the individual servo amplifiers or servo motors are adaptive to one another on the basis of the read data.

5. A management method for servo amplifiers and servo motors connected to a control device for a manufacturing machine such as a robot, machine tool and general industrial machine, comprising:

providing servo amplifiers and/or servo motors connected to said control device for any of the manufacturing machines with a storage storing data for discriminating properties of said servo amplifiers and/or servo motors; and storing in storage sections of said control devices a standard parameter table for discriminating fixed properties of said servo amplifiers and/or servo motors, wherein, when a model name of any one of a servo amplifier and a servo motor is inputted through said control devices, the data for discriminating properties corresponding to said model name are read from said storage sections, and also data for discriminating properties are read from said storage of the other of the servo amplifier and the servo motor, whereby it is determined whether or not the servo amplifier is adaptive to the servo motor.

6. A numerical control device in which a numerical control device body is connected with one or a plurality of servo amplifiers and servo motors controlled in operation by the numerical control device body, comprising:

said servo amplifiers and/or servo motors comprise a storage integral to said servo amplifiers and/or servo motors for storing necessary information for identifying fixed properties thereof; and a data readout connected to the numerical control device for fetching the information stored in the storage of each said servo amplifier and/or servo motor; and a display displaying the information read by said data readout for each servo amplifier and/or servo motor on the screen of a display unit of said numerical control device.

7. A numerical control device in which a numerical control device body is connected with one or a plurality of servo amplifiers and servo motors controlled in operation by the numerical control device body, comprising:

said servo amplifiers and/or servo motors comprise a storage integral to said servo amplifiers and/or servo motors stored with fixed information for the maintenance management of the servo amplifiers and/or servo motors; and a data readout connected to the numerical control device for fetching the information stored in the storage of each said servo amplifier and/or servo motor; and a display displaying the information read by said data readout for each servo amplifier and/or servo motor on the screen of a display unit of said numerical control device.

8. A numerical control device according to claim 6, wherein said numerical control device body includes an interface for delivering the information read by said data readout to an external computer.

9. A numerical control device according to claim 6, wherein said numerical control device body includes an interface for delivering the information read by said data readout to a public network.

* * * * *